US012600285B2

(12) United States Patent
McVicar et al.

(10) Patent No.: US 12,600,285 B2
(45) Date of Patent: Apr. 14, 2026

(54) TRACTOR UNITS FOR TRANSPORTING ELONGATED LOADS

(71) Applicant: Combilift, County Monaghan (IE)

(72) Inventors: Martin McVicar, County Monaghan (IE); Robert Moffett, Clontibret (IE); Josh Moffett, Clontibret (IE); Mark Whyte, County Monaghan (IE)

(73) Assignee: COMBILIFT, Gallinagh (IE)

( * ) Notice: Subject to any disclaimer, the term of this patent is extended or adjusted under 35 U.S.C. 154(b) by 868 days.

(21) Appl. No.: 17/426,206

(22) PCT Filed: Dec. 16, 2019

(86) PCT No.: PCT/EP2019/085230
§ 371 (c)(1),
(2) Date: Jul. 28, 2021

(87) PCT Pub. No.: WO2020/156729
PCT Pub. Date: Aug. 6, 2020

(65) Prior Publication Data
US 2022/0105860 A1     Apr. 7, 2022

(30) Foreign Application Priority Data
Jan. 28, 2019     (GB) ..................................... 1901106

(51) Int. Cl.
*B60P 3/40*          (2006.01)
*B62D 7/15*          (2006.01)
(Continued)

(52) U.S. Cl.
CPC .............. *B60P 3/40* (2013.01); *B62D 7/1509* (2013.01); *B62D 49/02* (2013.01); *B62D 61/06* (2013.01); *B60G 2300/36* (2013.01)

(58) Field of Classification Search
CPC ......... B60P 3/40; B62D 7/1509; B62D 49/02; B62D 61/06; B60G 2300/36
(Continued)

(56) References Cited

U.S. PATENT DOCUMENTS 4,683,973 A * 8/1987 Honjo ................... B60K 17/303
280/47.11
4,778,024 A * 10/1988 Matsumoto .............. B62D 1/28
180/211
(Continued)

FOREIGN PATENT DOCUMENTS

CN     102490644 A * 6/2012 ............... B60P 3/40
CN     102717745     10/2012
(Continued)

OTHER PUBLICATIONS

DE 755 translation (Year: 2015).*
(Continued)

*Primary Examiner* — Hilary L Gutman
(74) *Attorney, Agent, or Firm* — Whiteford, Taylor & Preston, LLP; Gregory M. Stone

(57) ABSTRACT

A tractor unit for transporting an elongated load includes a body that is supported, driven and steered by a wheel set comprising at least three ground-engaging wheels. At least two of the wheels are steerable and can transform between an aligned mode and a carousel mode. In aligned mode, the wheels are steerable and aligned with one another in a neutral steering position. In carousel mode, the wheels are oriented with their axes of rotation intersecting at a substantially common vertical axis within the the tractor unit body, so when the wheels are driven the tractor unit spins about this vertical axis. A load engagement mechanism is mounted pivotally on the tractor unit body about the vertical axis to allow counter rotation in an equal and opposite amount to the rotation of the tractor unit body in carousel mode, (Continued)

keeping the load fixed relative to the ground as the tractor unit spins.

17 Claims, 16 Drawing Sheets

(51) Int. Cl.
  *B62D 49/02* (2006.01)
  *B62D 61/06* (2006.01)
(58) Field of Classification Search
  USPC .......................................................... 410/44
  See application file for complete search history.

(56) References Cited

U.S. PATENT DOCUMENTS

| | | | | |
|---|---|---|---|---|
| 2002/0175009 A1* | 11/2002 | Kress | ...................... | B62D 7/04 |
| | | | | 180/199 |
| 2004/0195013 A1* | 10/2004 | Spark | ...................... | B62D 9/00 |
| | | | | 180/6.24 |
| 2005/0061570 A1* | 3/2005 | McVicar | ................ | B62D 7/026 |
| | | | | 180/308 |
| 2006/0113449 A1* | 6/2006 | Nies | ........................ | F03D 13/40 |
| | | | | 248/282.1 |
| 2008/0245593 A1* | 10/2008 | Kim | ........................ | B62D 61/08 |
| | | | | 180/65.245 |
| 2010/0230201 A1* | 9/2010 | McVicar | ............. | B66F 9/07568 |
| | | | | 180/308 |
| 2013/0292199 A1 | 11/2013 | Blanton | | |
| 2014/0305728 A1* | 10/2014 | Jezequel | .............. | B62D 61/065 |
| | | | | 180/215 |
| 2016/0002016 A1* | 1/2016 | Mcvicar | .............. | B66F 9/07568 |
| | | | | 254/2 R |
| 2018/0236862 A1* | 8/2018 | Peng | ........................ | B60K 1/00 |
| 2024/0109584 A1* | 4/2024 | Mcvicar | ................... | B66F 9/22 |

FOREIGN PATENT DOCUMENTS

| | | | | | | |
|---|---|---|---|---|---|---|
| CN | 202541402 | U | * | 11/2012 | | |
| CN | 204196767 | U | * | 3/2015 | | |
| CN | 104526697 | A | * | 4/2015 | | |
| CN | 105365653 | A | * | 3/2016 | ............... | B60P 3/40 |
| CN | 205202817 | U | * | 5/2016 | | |
| CN | 207613718 | U | * | 7/2018 | | |
| CN | 208854616 | U | * | 5/2019 | ............. | B25J 13/08 |
| CN | 209727979 | U | * | 12/2019 | | |
| CN | 112479094 | A | * | 3/2021 | | |
| CN | 117428722 | A | * | 1/2024 | | |
| CN | 119018243 | A | * | 11/2024 | | |
| DE | 102009040200 | A1 | * | 3/2011 | ............. | F03D 13/40 |
| DE | 202012009041 | | | 1/2013 | | |
| DE | 202014000755 | | | 5/2015 | | |
| DE | 102016113260 | A1 | * | 1/2018 | .......... | B62D 15/021 |
| DE | 202019003072 | U1 | * | 12/2020 | | |
| DE | 102022132931 | A1 | * | 6/2024 | .......... | B62D 7/1509 |
| EP | 1657140 | A2 | * | 5/2006 | .............. | B62D 1/02 |
| EP | 1659026 | A1 | * | 5/2006 | ............. | F03D 13/40 |
| EP | 2687403 | | | 1/2014 | | |
| ES | 2575371 | T3 | * | 6/2016 | ............... | B60J 5/02 |
| GB | 2406317 | A | * | 3/2005 | ............... | B66F 9/06 |
| GB | 2531778 | A | * | 5/2016 | ......... | B66F 9/07568 |
| JP | 2004243805 | A | * | 9/2004 | ............. | F03D 13/40 |
| WO | 2011/113127 | | | 9/2011 | | |
| WO | WO-2011124574 | A1 | * | 10/2011 | ............... | B60P 3/40 |
| WO | WO-2011134472 | A1 | * | 11/2011 | ............. | F03D 13/40 |
| WO | WO-2025113887 | A1 | * | 6/2025 | ............... | B60P 3/40 |

OTHER PUBLICATIONS

Machine translation WO 03059799 (Year: 2003).*
Machine translation of EP 2687403 (Year: 2014).*
International Search Report issued in corresponding International Application No. PCT/EP2019/085230 on Mar. 27, 2020.

* cited by examiner

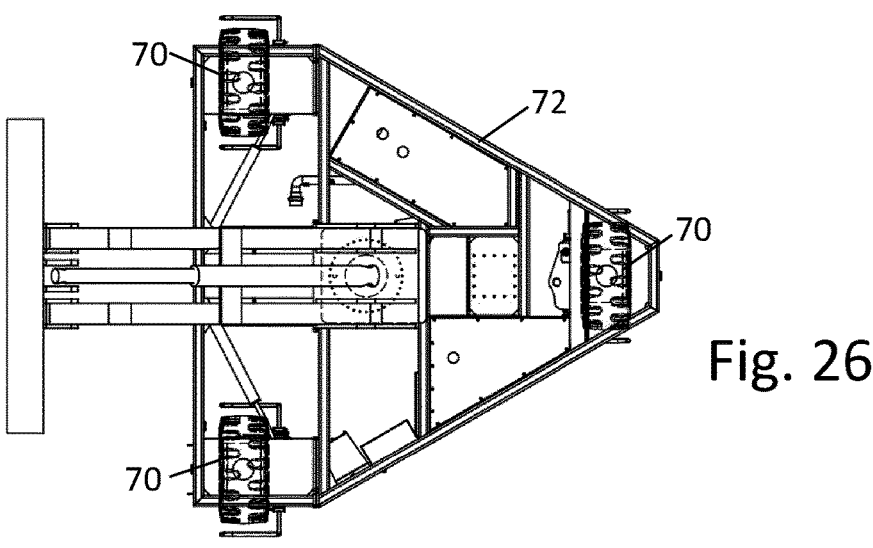
Fig. 26
Fig. 27
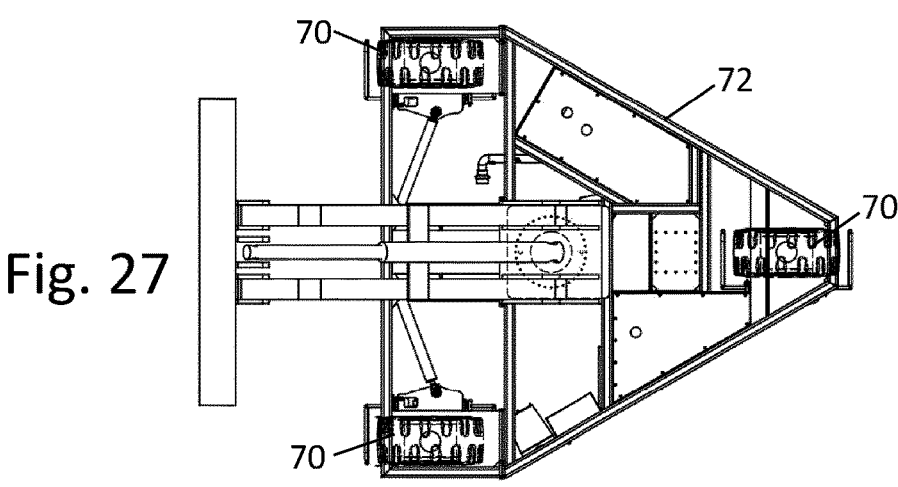
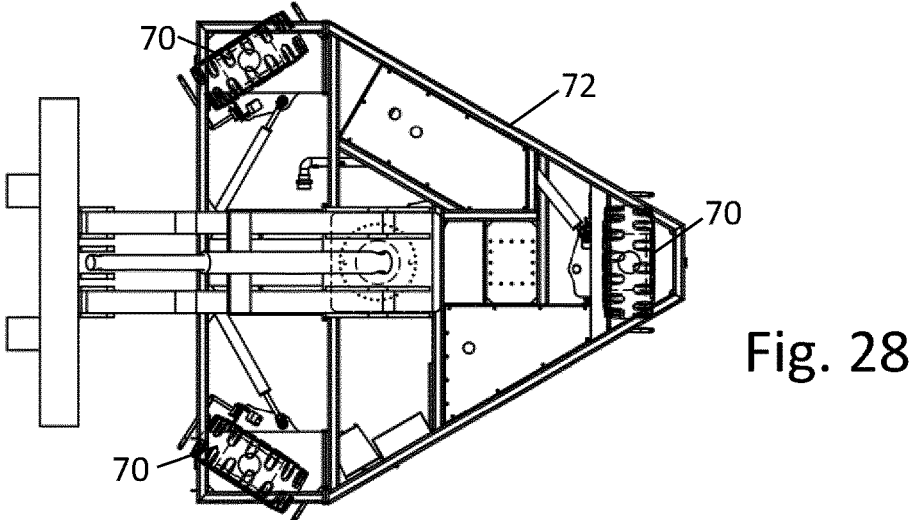
Fig. 28

TRACTOR UNITS FOR TRANSPORTING ELONGATED LOADS

TECHNICAL FIELD

This invention relates to tractor units for transporting elongated loads such as a wind turbine blade or wind turbine tower segment.

BACKGROUND ART

Elongated loads such as wind turbine blades or tower segments, or indeed other items of similar elongated dimensions, cannot be readily accommodated on conventional vehicles such as articulated lorries. The length of this kind of load brings significant challenges.

One of the preferred modes of transport involves a tractor unit and a trailer unit. The tractor unit is driven and steerable and mounts to an end of the load. The trailer unit supports the span of the load, usually in the rear half of the load but not at the rear end. The trailer unit is typically undriven, though it may be driven, and may or may not be steerable. The load itself provides the connection between the tractor and trailer units. The primary function of the trailer unit is to ensure the trailing end of the load is clear of the ground and supported for following the tractor.

While such an arrangement is useful, problems can still exist due to the lack of manoeuvrability of the tractor and/or trailer units. This is most evident when manoeuvring the load in confined spaces, where it must be steered sharply.

DISCLOSURE OF THE INVENTION

There is provided a tractor unit for transporting an elongated load such as a wind turbine blade or wind turbine tower segment, comprising:

a tractor unit body;

a wheel set comprising at least three ground-engaging wheels, one or more of which is driven, said wheel set supporting, driving and steering the tractor unit body; and a load engagement mechanism for mounting to and supporting said elongate load, said load engagement mechanism being mounted on said tractor unit body;

wherein at least two of the wheels of the wheel set are steerable wheels whose orientation may be varied to transform the wheel set between an aligned mode of operation and a carousel mode of operation;

wherein in the aligned mode of operation the wheels of the wheel set are aligned with one another when in a neutral steering position causing the tractor unit body to follow a straight line when driven with neutral steering, and are steerable to deviate the direction of travel to either side of said straight line;

wherein in the carousel mode of operation the wheels of the wheel set are oriented relative to one another with their axes of rotation intersecting at a substantially common vertical axis located within the lateral extent of the tractor unit body, whereby when the one or more wheels are driven in said carousel mode of operation, the tractor unit body rotates about said common vertical axis;

wherein said load engagement mechanism is mounted pivotally on the tractor unit body about said common vertical axis, such that the tractor unit body may rotate in said carousel mode of operation about the common vertical axis relative to the ground while the load engagement mechanism remains in fixed position relative to the ground by counter-rotation of the load engagement mechanism relative to the tractor unit body as the tractor unit body rotates.

By having the load engagement mechanism pivot on a common axis with a centre of rotation of the tractor unit when in carousel mode, manoeuvrability is increased considerably. The tractor unit can for example be moved in the aligned mode, pulling the load directly behind it, then switched to carousel mode and rotated about the common axis through 90 degrees, while the load engagement mechanism counter-rotates to keep the load stationary with respect to the ground. Then aligned mode can be re-engaged with the tractor unit facing at right angles to the former direction of travel, to pull the end of the load mounted on the load engagement mechanism in a perpendicular direction to the axis of the load itself (or, with steering, the new travel direction can deviate to either side of the 90-degree direction to any desired amount). The tractor unit can thus spin or pivot around the common vertical axis and because this is located within the lateral extent (or footprint) of the tractor body, this rotational movement occurs without translation of the axis relative to the ground A further advantage of the mounting of the load engagement mechanism on the same common axis is that the load carried on the load engagement mechanism is transferred directly onto this axis, avoiding the need for counterbalancing of the load.

The tractor unit is particularly adapted and suited for loads which have similar dimensions and weights to largescale wind turbine blades or wind turbine tower segments. However, the exact nature of the load may be varied by providing an appropriate mounting and engagement system for the load to be carried.

Preferably, the load engagement mechanism is mounted on the tractor unit body by a swivel mount and the tractor unit further comprises a motor for rotating the load engagement mechanism relative to the tractor unit body about said swivel mount.

Further preferably, said motor is a low-pressure motor. The motor preferably provides sufficient torque to turn and hold the load engagement mechanism and allow the tractor unit to turn when transporting the load.

Preferably, the tractor unit comprises a steering controller for controlling the steering of the steerable wheels of the wheel set.

Preferably, said steering controller is responsive to received input signals to switch the wheel set between said aligned and carousel modes of operation and being responsive, when in said aligned mode of operation, to vary the steering to follow a straight or curved path according to received steering inputs.

Preferably, the steering controller receives steering inputs from a remote-control unit.

Preferably, the tractor unit comprises a drive controller for controlling the speed and optionally the direction of drive applied to the or each driven wheel of the wheel set in response to received input signals.

Preferably, the tractor unit further comprises a motor controller for controlling the motor, said controller being operable to determine the angular rotation of the tractor unit body about the common vertical axis when in the carousel mode of operation, and to cause the simultaneous counter-rotation of said load engagement mechanism in an equal and opposite angular amount to maintain the position of the load engagement mechanism stationary with respect to the ground.

The motor controller preferably receives as its input a signal indicative of the speed at which the or each driven wheel is being driven, and generates as an output a motor control signal effective to cause a counter-rotation of the load engagement mechanism in an equal and opposite angular amount.

Preferably, the wheel set comprises three wheels, of which a pair are disposed on one side of the tractor unit body, and of which the other wheel is disposed at an opposed side of the tractor unit body.

Further, preferably, the pair of wheels disposed on one side of the tractor unit body are aligned with one another when in the aligned mode with neutral steering and are both steerable in response to steering inputs, with the other wheel being in a fixed orientation.

Further, preferably, the pair of wheels disposed along one side of the tractor unit body are steerable to achieve the carousel mode by aligning their axles towards said common vertical axis, said common vertical axis lying along the direction of alignment of the axle of the other wheel, said common vertical axis lying within the triangle defined by the three wheel positions.

Preferably, said wheel set comprises three wheels defining a triangle when viewed in plan view, and said common vertical axis is at the incentre of said triangle.

Preferably, all wheels of the wheel set are driven.

Preferably, the load engagement mechanism comprises at least one hydraulically extendable arm which can be extended or retracted to raise and lower a load mounted on the load engagement mechanism.

Further, preferably, said hydraulically extendable arm forms one side of a triangle, the other two sides being formed of fixed length members.

Further, preferably, the load engagement mechanism is mounted on the tractor unit body at an apex of said triangle, said apex being between two sides of which one is the hydraulically extendable arm.

Further, preferably, the fixed length member on the side opposite said apex is a mounting member adapted for mounting to a load, such that when a load is mounted to said mounting member, the angle adopted by the hydraulically extendable arm relative to the tractor unit body is determined by the vertical orientation of the mounting member and the length of the hydraulically extendable arm.

Typically, the load will be a large mass, elongate load, which forces an orientation onto the mounting member. For example, the mounting member may be affixed to an end face of a wind turbine blade which is supported towards the other end by a trailer unit at a predetermined height above the ground at the point where the trailer unit is situated. Then if the vehicle travels over slopes and bumps, or across depressions or hills, the triangle formed by the load engagement mechanism can flex at the fulcrum defined at the apex of the triangle to accommodate the movements of the load. For example if the tractor unit has passed the lowest point of a depression between a downwardly sloping section and an upwardly sloping section, the load will be raised (in an angular sense) relative to the tractor unit, which is accommodated by the triangle pivoting upwardly about the apex relative to the tractor unit body. The vertical force on the vehicle remains the same throughout this movement, i.e. there is no moment effect tending to lift the tractor unit or to compress it downwardly regardless of the slope profile that the vehicle is traversing.

Further, preferably, the load engagement mechanism comprises a supporting hydraulic cylinder for supporting the weight of the mechanism and adjusting the position thereof during engagement with a load.

The invention further provides a system for transporting an elongated load such as a wind turbine blade or wind turbine tower segment, comprising:

a tractor unit according to claim 1; and a wheeled trailer unit for supporting the load at a position remote from the tractor unit, such that the tractor unit and wheeled trailer unit are connected by the load itself.

BRIEF DESCRIPTION OF THE DRAWINGS

The invention will be further illustrated by the following description of embodiments thereof, given by way of example only with reference to the accompanying drawings, in which:

FIGS. 26-28 show a further embodiment of tractor unit with three steerable, driven wheels.

DETAILED DESCRIPTION OF PREFERRED EMBODIMENTS

Figure 1:
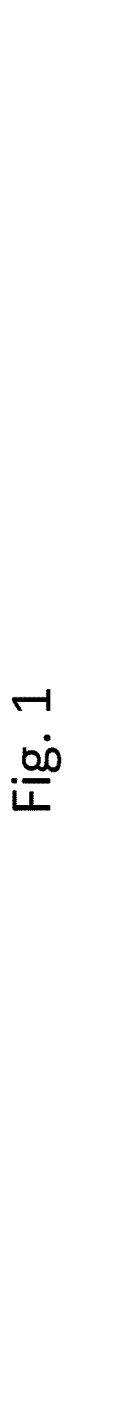
FIG. 1 is a side view of a tractor unit shown alongside a load fitted with a trailer unit before the tractor unit has engaged with the load.
Figure 2:
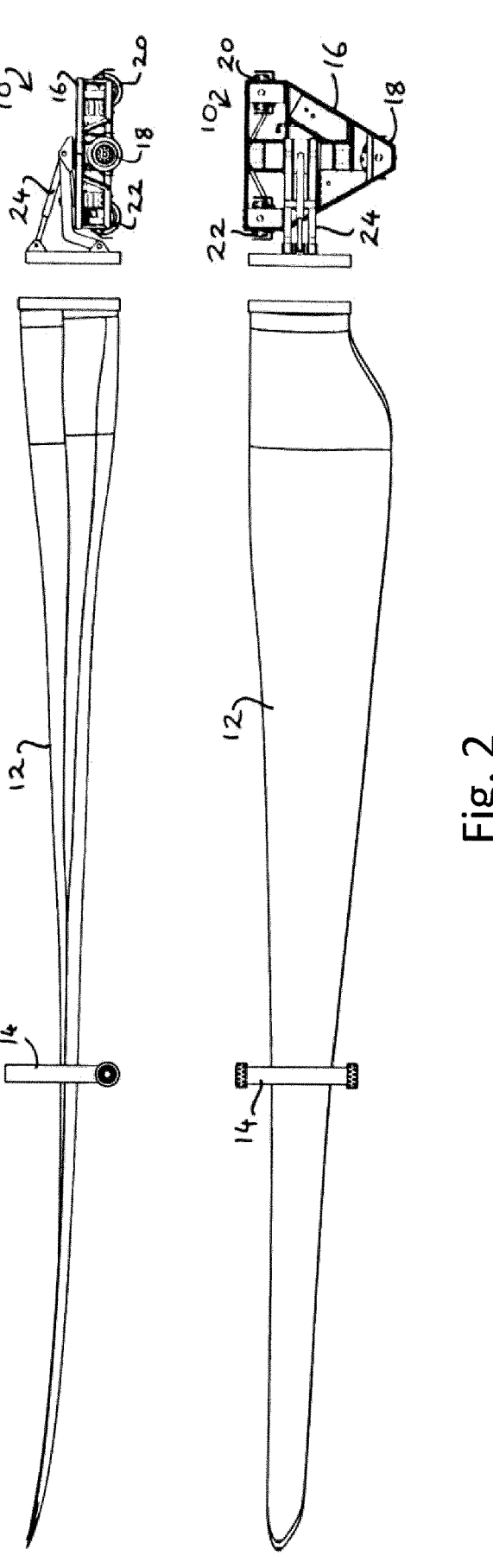
FIG. 2 is a plan view of the FIG. 1 arrangement.

In FIG. 1 there is indicated, generally at 10, a tractor unit shown alongside a load 12 in the form of a wind turbine blade, the load 12 being partially supported along its length by a wheeled trailer unit 14. FIG. 2 shows the same arrangement in plan view from above. It can be seen that the tractor unit 10 is in the form of a generally triangular chassis 16 having a wheel set comprising three wheels 18, 20, 22, one at each corner. A load engagement mechanism 24 is mounted on top of the chassis.

Figure 3:
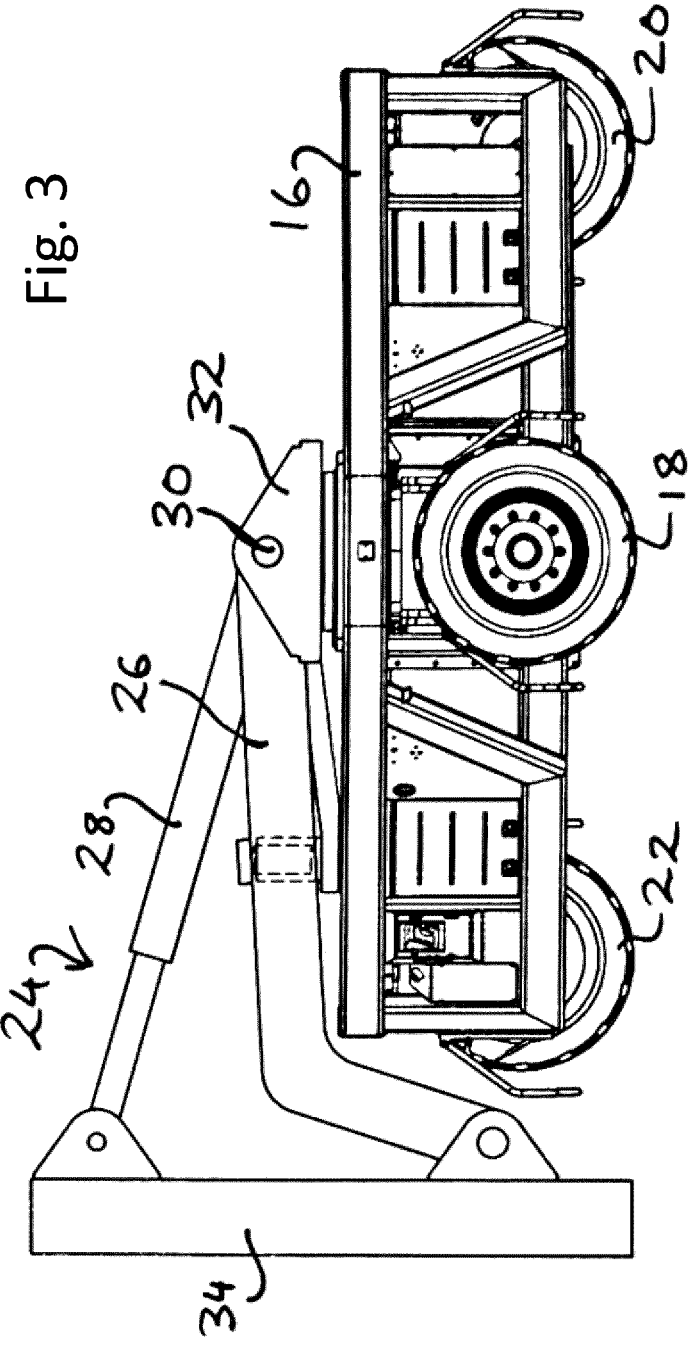
FIG. 3 is an enlarged side view of the FIG. 1 tractor unit and the end of the load to which it is to be attached.
Figure 3:
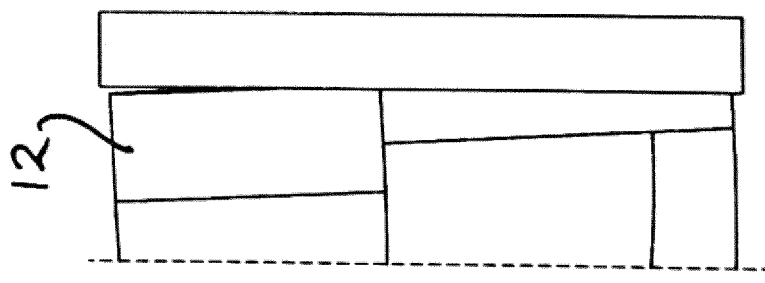

FIG. 3 shows the tractor unit 10 in an enlarged side view and with the wheels 18, 20, 22 visible and the load engagement mechanism 24 alongside the end of the load 12. The load engagement mechanism 24 has a pair of arms 26, 28 mounted on a common axis pin 30 to a swivelling support 32. Arm 28 is a hydraulic cylinder which is extendable, and due to the fixed length of arm 26, extension of the hydraulic cylinder 28 causes both arms to lift a support plate 34 connected to the opposite ends of the arms 26 and 28 as will be seen further below. The support plate is adapted to mount to the load in conventional manner.

Figures 4, 5:
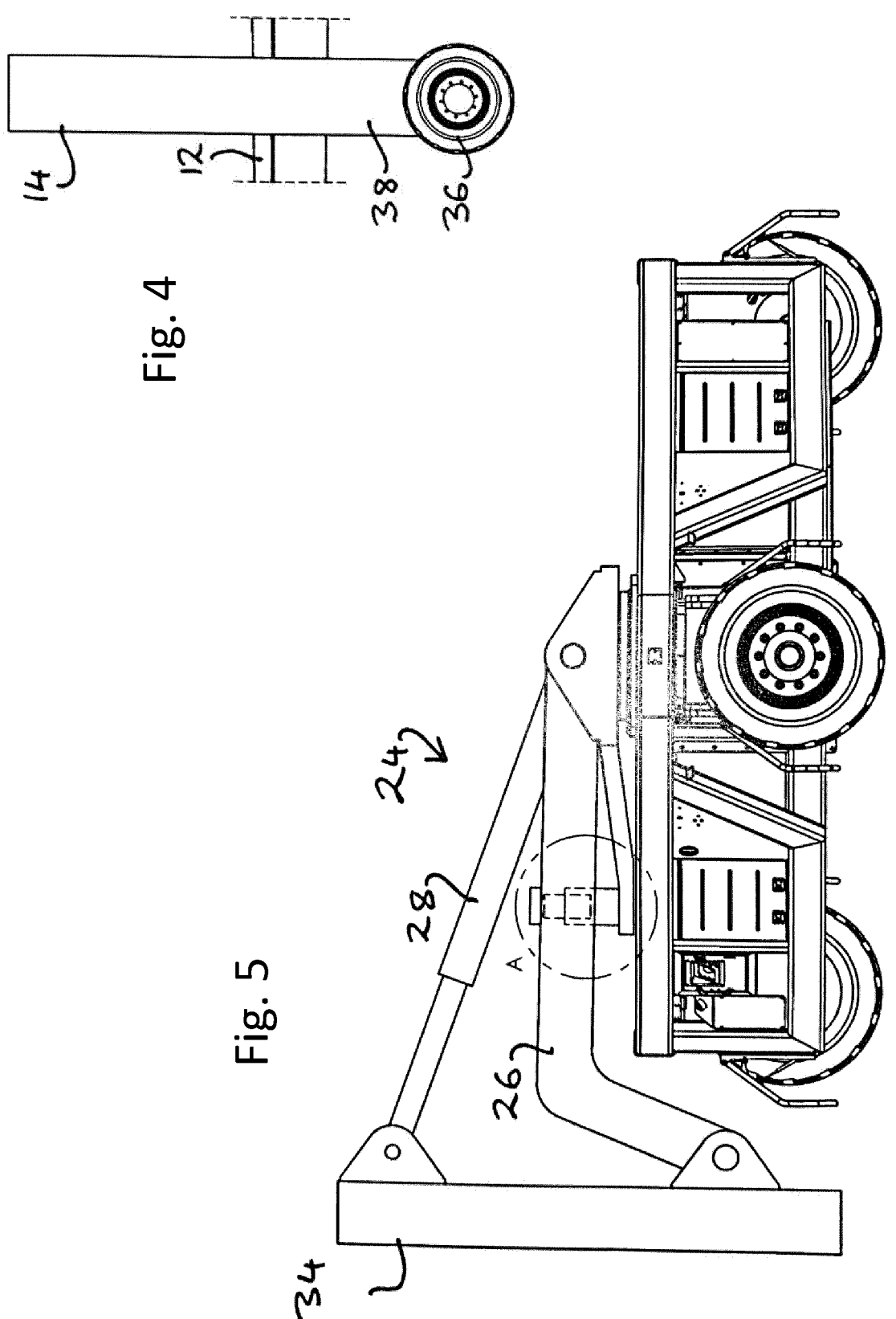
FIG. 4 is an enlarged side view of the FIG. 1 trailer unit.
FIG. 5 a side view of the tractor unit, similar to FIG. 3, but with the load engagement mechanism raised for engagement with the load.

FIG. 4 shows the trailer unit 14 supporting load 12. The trailer unit 14 has a pair of wheels 36 engaging with the ground and supporting a load-bearing frame 38. Within the load-bearing frame 38 a support mechanism (not shown) supports the load and can raise or lower it as required according to the height set by the load engagement mechanism 24 shown in FIG. 3.

Figures 6, 7:
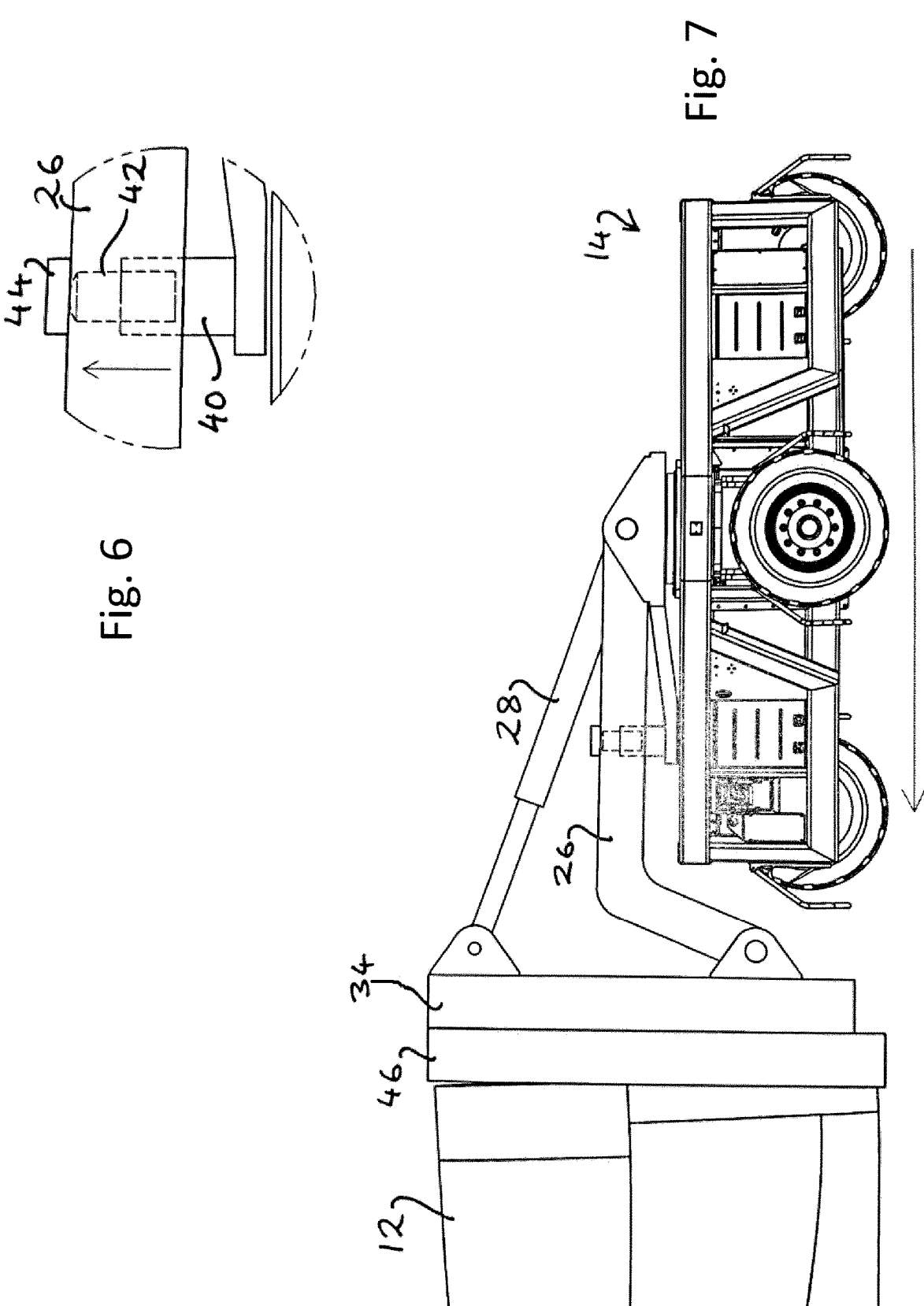
FIG. 6 is a detail of the load engagement mechanism as shown in FIG. 5.
FIG. 7 is a side view of the tractor unit after engagement with the load.

Referring now to FIGS. 5 and 6, the load supporting mechanism 24 is shown as it begins to raise. When the lower arm 26 is lowered, as shown in FIG. 3 and in FIG. 5, it is supported on a hydraulic cylinder 40 and piston 42 which act on a transverse bar 44 mounted between two struts making up the arm 26. The hydraulic cylinder 40 and piston 42 allow the lower arm to be raised for engagement with the load, and also to prevent the support plate 34 from striking the ground. Prior to engagement of the support plate with the load, the plate would be free to tilt upon extension of the hydraulic cylinder 28, so the provision of the hydraulic cylinder 40 and piston 42 provide a raising mechanism independent of the hydraulic cylinder 28 for the initial positioning of the support plate to attach to the load.

FIG. 7 shows the tractor unit 14 after it has engaged with the load 12. The load engagement mechanism has been raised to the same position as was shown in FIG. 5, and the support plate 34 has been secured against and mounted to a mounting plate 46 on the end of the load 12.

Figure 8:
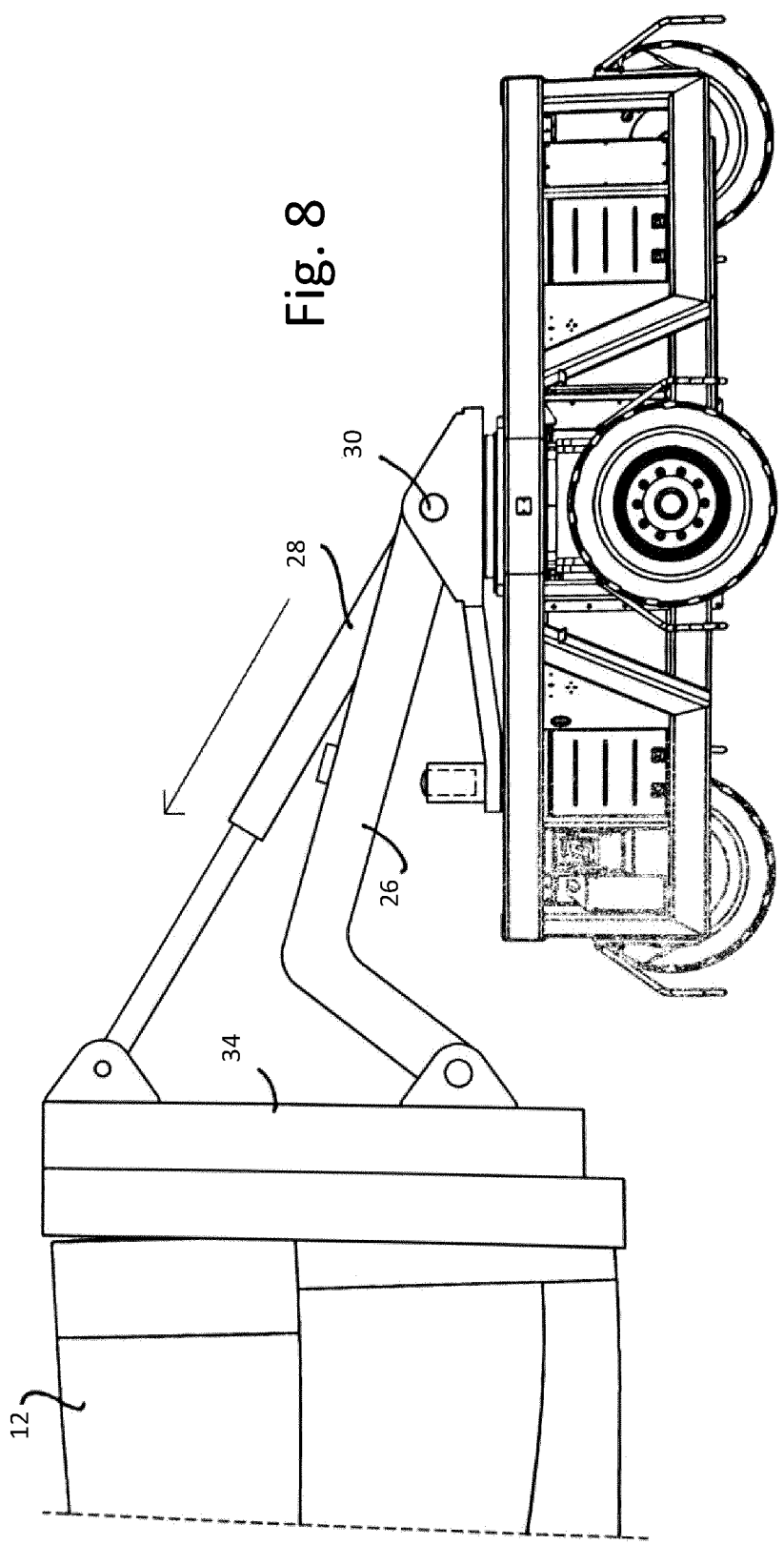
FIG. 8 is a side view of the tractor unit, similar to FIG. 7, but with the load raised for transportation.

In FIG. 8, the load has been raised by extending the hydraulic cylinder of arm 28, causing both arms 26, 28 to pivot around the pin 30 and raise the support plate 34 into the air, there by lifting the load 12.

Figure 9:
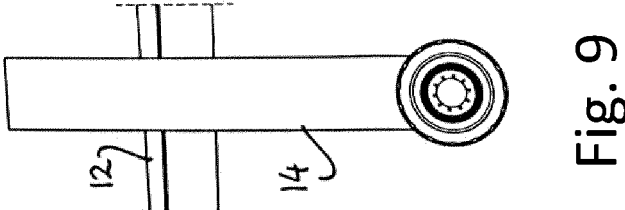
FIG. 9 is a side view of the trailer unit, similar to FIG. 4, but with the load raised for transportation.

As seen in FIG. 9, when the load 12 is raised by the load engagement mechanism, it can be raised a corresponding height by the supporting mechanism of the trailer unit 14. However, such a lifting mechanism on the trailer is not essential provided the trailing end of the load is clear of the ground.

Figure 10:
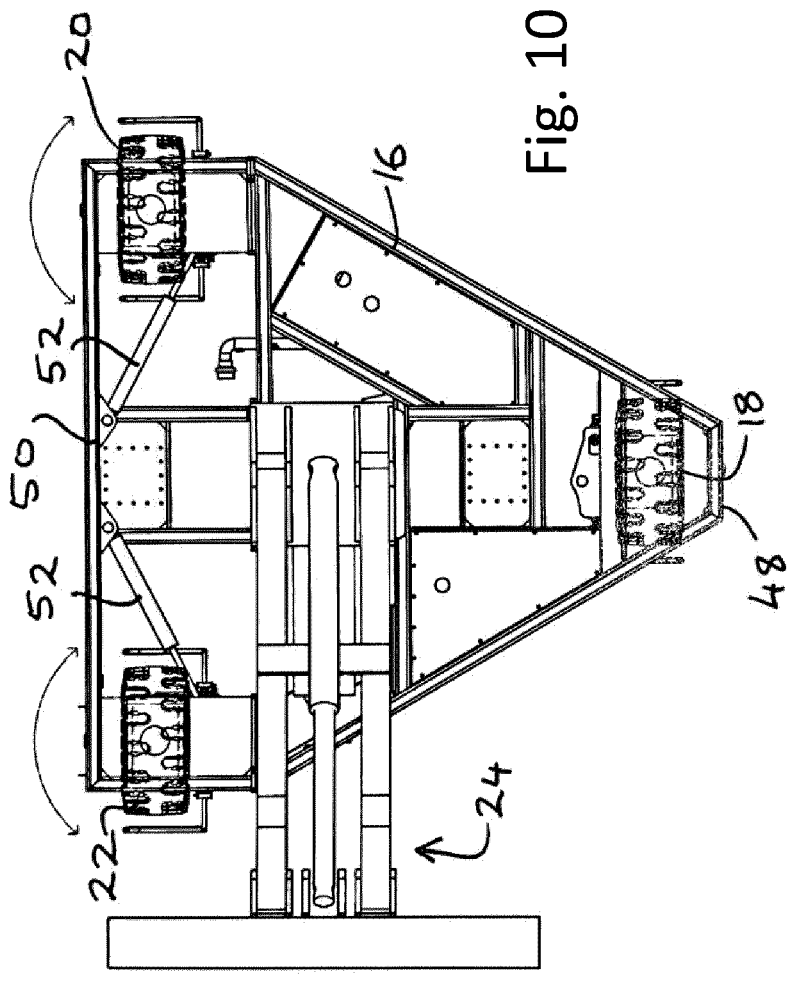
FIG. 10 is a plan view of the tractor unit, with the wheel set in aligned mode.

In FIG. 10, the tractor unit is seen in plan view, with the wheels 18, 20, 22 of the wheel set in aligned mode. In this exemplary embodiment, there is a single wheel 18 at one side 48 of the triangular chassis 16, and a pair of wheels 20, 22 aligned with one another on the opposite side 50. In this embodiment, the wheel 18 is fixed, i.e. not steerable, and the wheels 20, 22 are both steerable, as indicated by the arcuate arrows above the wheels.

Steering is achieved by a control unit (not shown) which controls the actuation of a pair of hydraulic steering cylinders 52, one of which controls each wheel 20, 22. The skilled person will be aware that the hydraulic steering cylinders will be part of a hydraulic circuit and that control valves and pumps within the circuit will be operated according to control signals to translate steering inputs into appropriate actuations of the steering cylinders to achieve a desired steering angle.

Alternative steering mechanisms and arrangements are possible, for example the control can be by mechanical linkages, by electric steering motors, or by any other means.

Similarly, while the tractor unit of this exemplary embodiment has three driven wheels 18, 20, 22, with a hydraulic or hydrostatic drive motor mounted in the hub of each wheel and driven by a hydraulic drive circuit, the number of driven wheels is at the choice of the system designer, as is the motive force chosen. Thus, instead of hydraulic drive, the wheels can be electrically driven, or driven by an internal combustion engine, and so on. Hydraulic drive to all three wheels is preferred in the illustrated embodiment because it provides good traction and control when manoeuvring very heavy loads.

Figure 11:
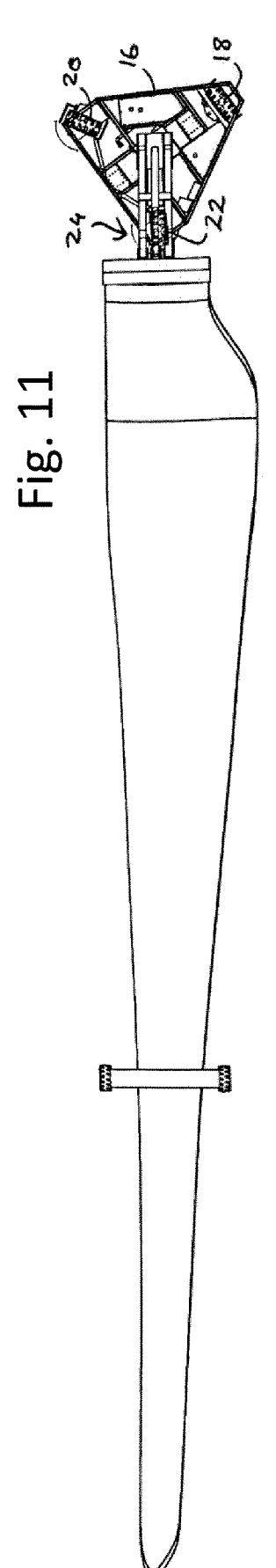
FIG. 11 is a plan view of the assembled tractor unit, trailer unit and load, with the tractor unit wheel set in aligned mode and being steered to the left.
Figure 12:
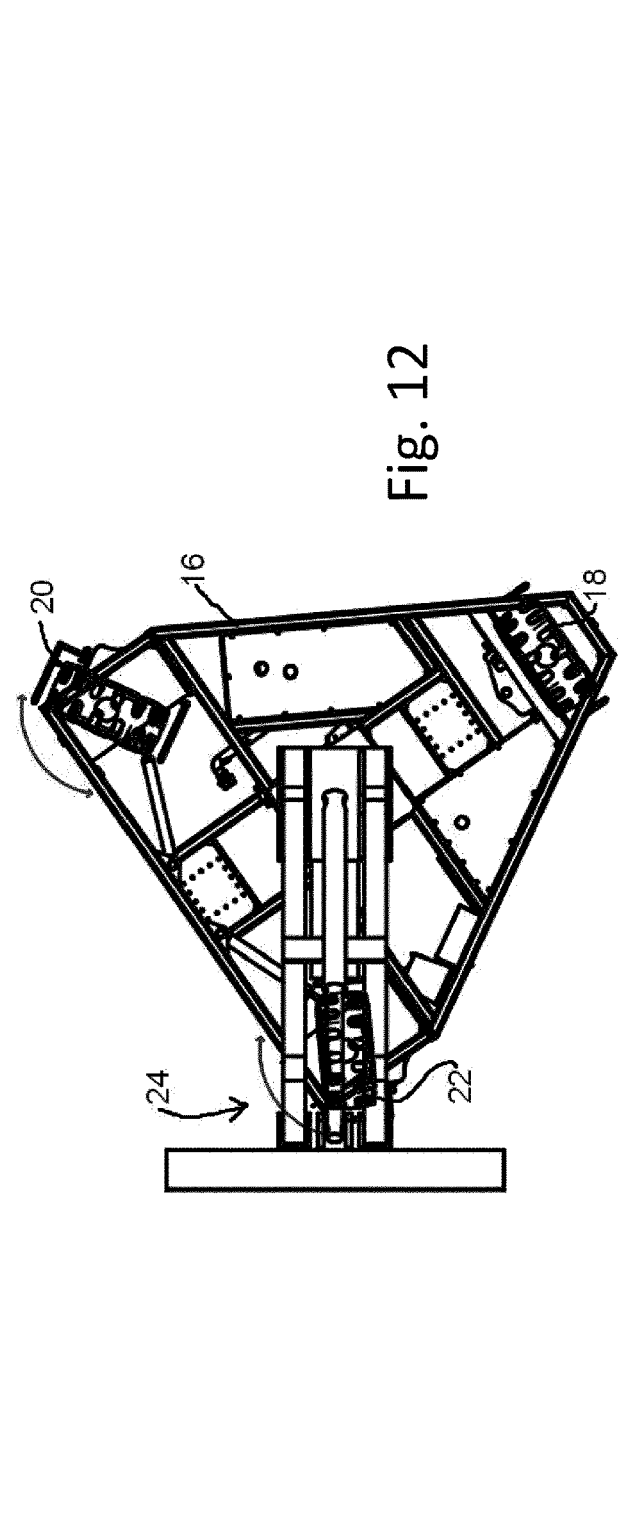
FIG. 12 is a plan view of the tractor unit from FIG. 11.

As seen in FIG. 11, therefore, by angling the steerable wheels 20, 22 appropriately, the tractor unit can be steered to the left. Angling the wheels oppositely would steer the tractor unit to the right. FIG. 12 shows the same view as FIG. 11 but with the tractor unit enlarged and omitting the load.

Figure 13:
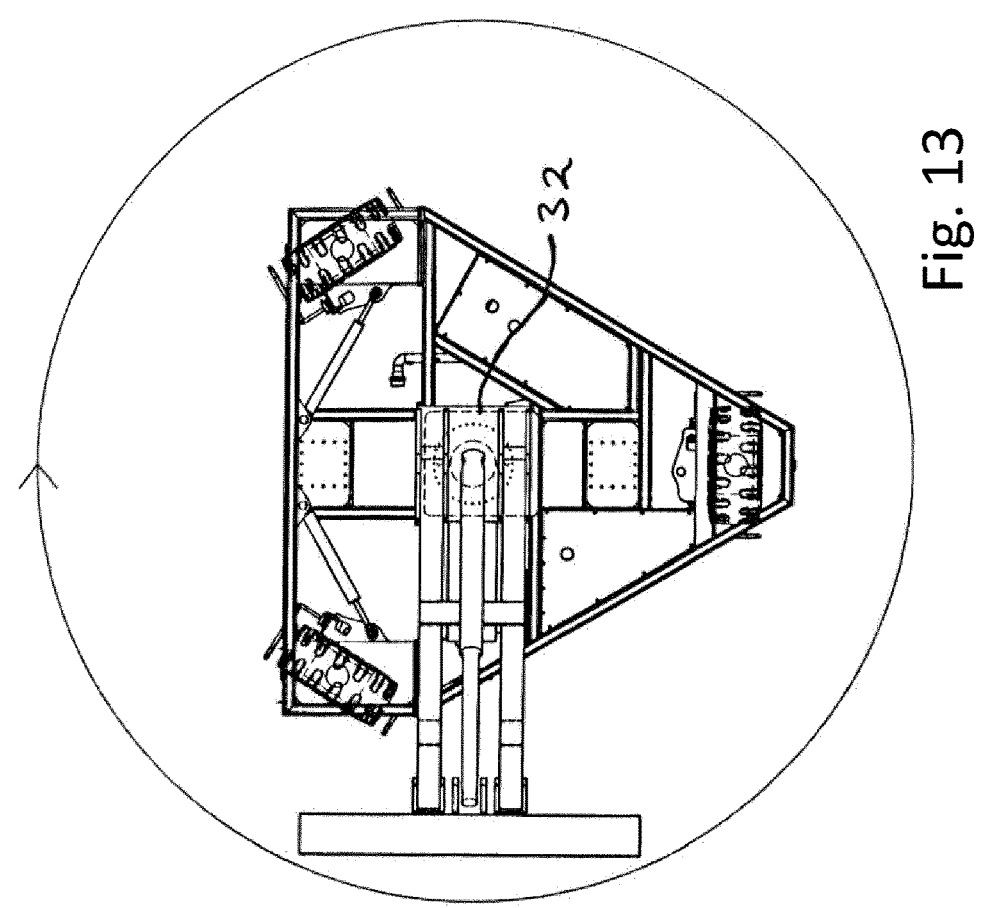
FIG. 13 is a plan view of the tractor unit with the wheel set in carousel mode.

FIG. 13 shows the tractor unit 14, with the wheel set in carousel mode.

It can be seen that in carousel mode, the steerable wheels 20, 22 are angled oppositely to the direction shown in FIG. 11 so that the axes of rotation of the steerable wheels are directed inwardly to intersect with one another within the lateral confines of the chassis footprint. Furthermore, referring to FIG. 14, the axes of rotation of each of the three wheels 18, 20, 22 intersect at a common vertical axis 54 which is located within the lateral extent of the tractor unit body. This means that each wheel lies circumferentially on a notional circle centred on the same spot as the other wheels, and when driven the tractor unit can spin i.e. turn about an axis that is within its own lateral extent and without translational movement.

Moreover, the vertical axis 54 where the rotation axes of the three wheels intersect is the incentre of the triangle. An incentre is constructed by taking the intersection of the angle bisectors (shown as the broken lines in FIG. 14) of the three vertices of the triangle. The wheels are each perpendicular to their respective angle bisector.

Figure 14:
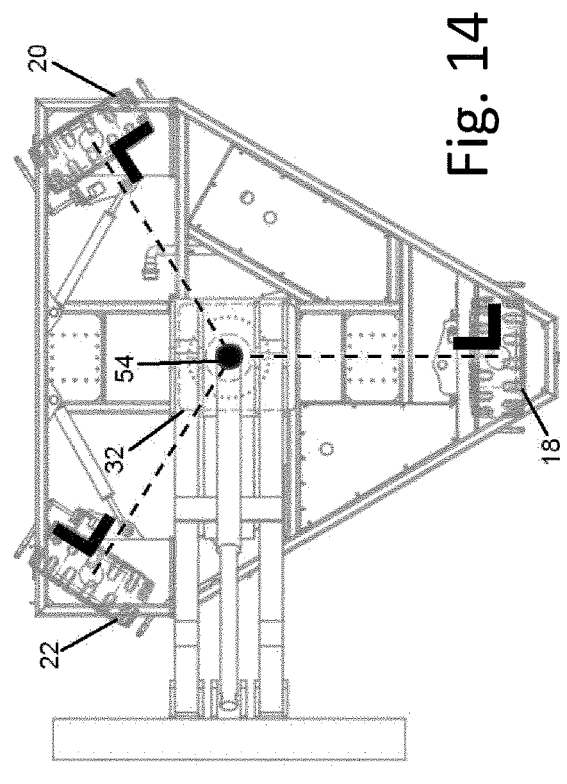
FIG. 14 is a schematic view, identical to FIG. 13 but with an overlay illustrating the wheel alignment in carousel mode.

Finally, and crucially it can be observed that the vertical axis 54 is the centre of rotation for the swivelling support 32 on which the load engagement mechanism is mounted. This means that when the tractor unit spins around the vertical axis (by placing the wheel set in carousel mode as shown in FIGS. 13 and 14, and driving the wheels to cause the tractor unit to spin on the vertical axis 54) it is possible to avoid any movement whatsoever of the load simply by counter-rotating the swivelling support 32 by an equal and opposite amount to the angular rotation of the tractor unit itself.

By ensuring that the swivelling support is within the triangle formed between the wheels, there is a further advantage in that the load carried on the tractor unit is transferred to within the centre of the vehicle, so no counter-balance is required.

The swivelling support 32 is provided with a low-pressure motor which will be described further below, which may be used to achieve this counter-rotation automatically when the vehicle is in carousel mode, by slaving a motor controller for the swivelling support to the drive motor controller.

Referring to FIGS. 15-20, The use of Carousel mode to achieve a particularly advantageous manoeuvre is illustrated. FIGS. 15-20 are sequential snapshots of the movement of the chassis 16 during this manoeuvre.

Figures 15, 16, 17:
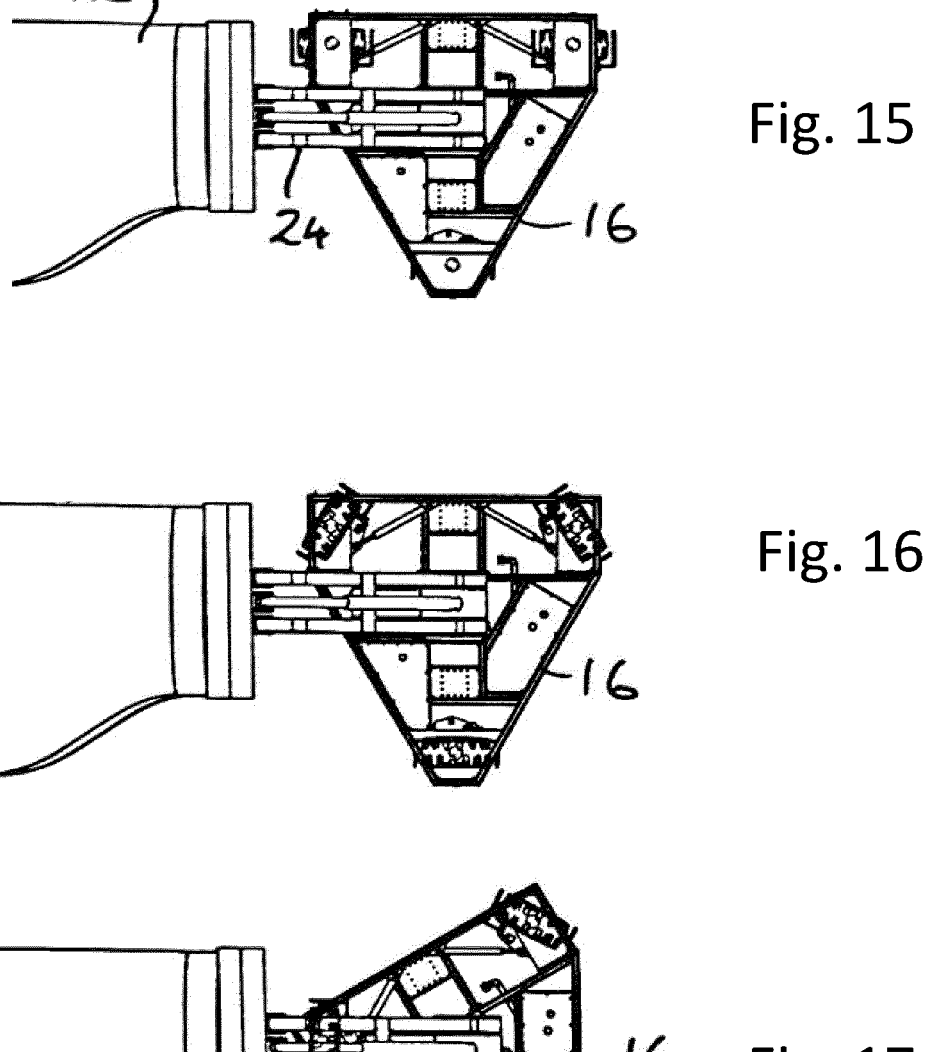
FIGS. 15-20 show successive stages in the transition of the tractor unit from steering in aligned mode in a direction parallel to the axis of the load (FIG. 15) through rotation in carousel mode (FIGS. 16-19) until the tractor unit is oriented at right angles to the axis of the load and is in aligned mode (FIG. 20) to drive in a perpendicular direction to the original direction.

In FIG. 15, the tractor unit is in the configuration shown in FIG. 10. In other words, the wheels are in the aligned mode, with each wheel being aligned with the longitudinal axis of the load, parallel to the support arms of the load engagement mechanism 24.

In FIG. 16, the operator has engaged carousel mode. The wheels are steered to take up the position shown also in FIG. 13. The skilled person will appreciate that driving the wheels will now cause the chassis to spin rather than to translate. Additionally, it will spin about the vertical axis upon which the swivelling support 32 of the load engagement mechanism is centred.

Figures 18, 19, 20:
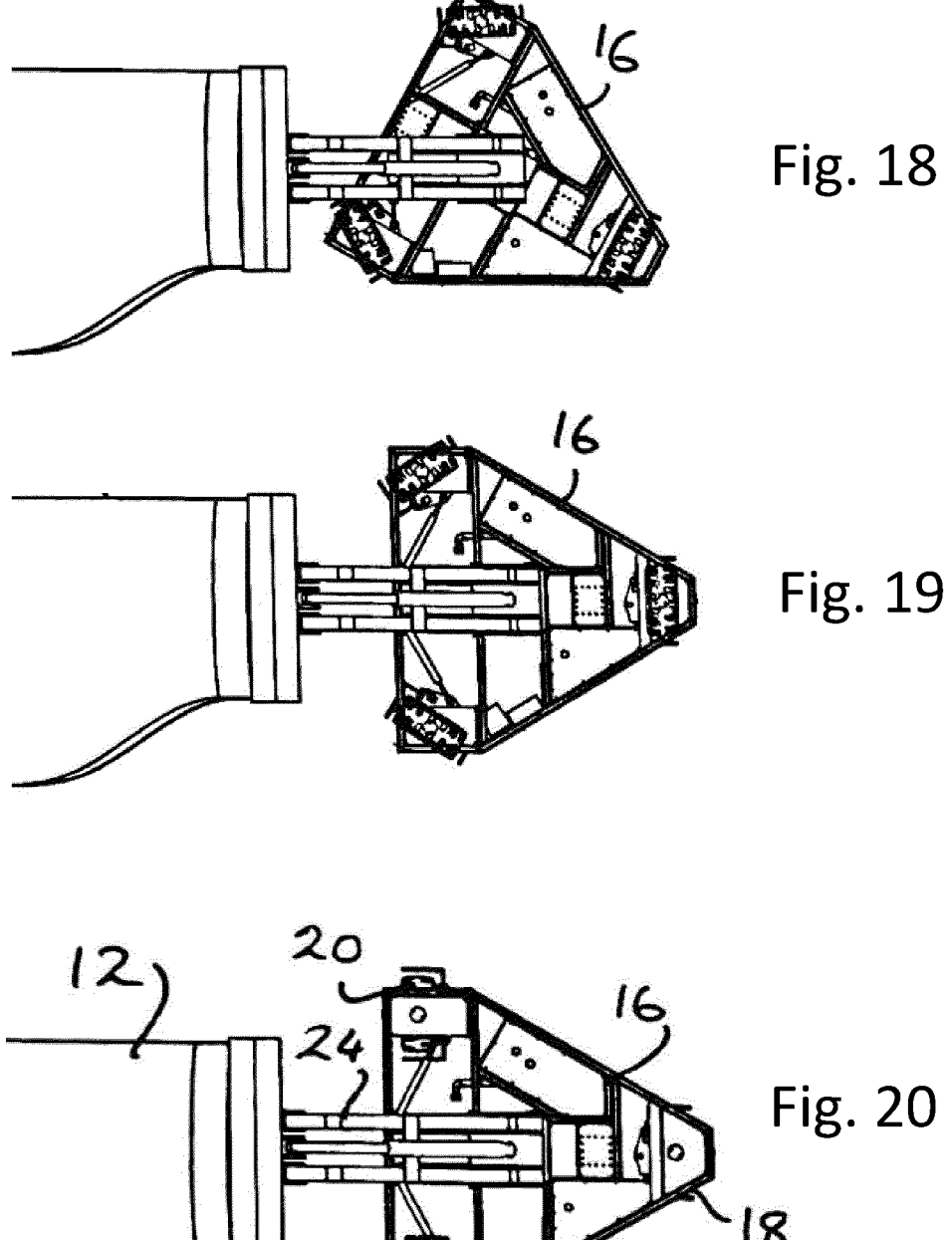

In FIG. 17, the chassis has begun to spin counter clockwise. FIG. 18 shows a further progression. In FIG. 19, the chassis has completed a 90 degree turn from the position shown in FIG. 16. it will be observed that throughout this movement, the position of the load engagement mechanism and of the load itself is completely unchanged.

Finally, as seen in FIG. 20, the operator re-engages aligned mode. The steerable wheels 20, 22 revert to an orientation where they are aligned with one another and parallel with the unsteered wheel 18. All three wheels are now perpendicular to the load so that the load engagement mechanism 24 can be pulled or pushed in a direction which is 90 degrees to the former direction (with neutral steering of the wheels), or indeed by appropriately steering the wheels 20, 22, at any suitable angle greater than or less than 90 degrees.

Figure 21:
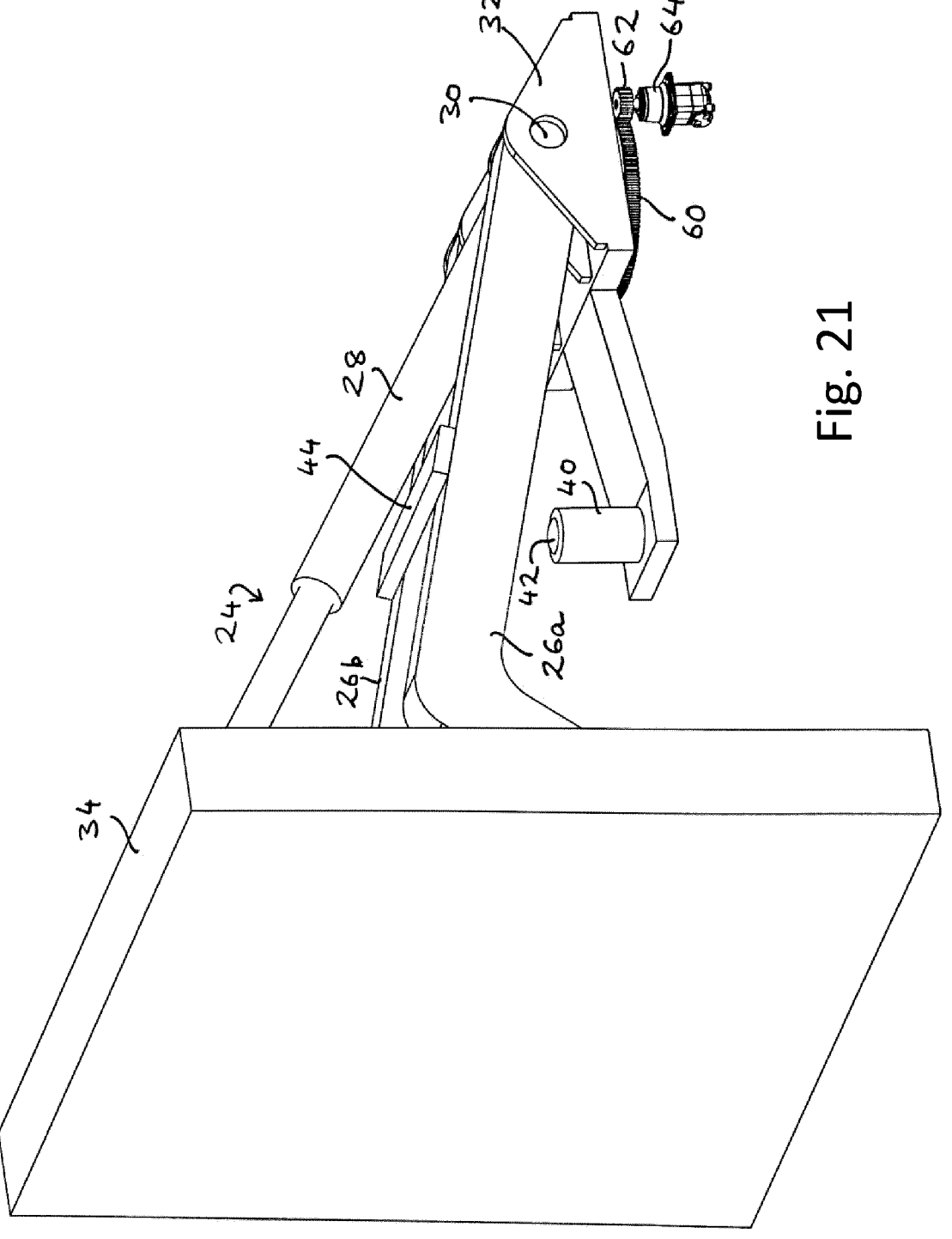
FIG. 21 is a perspective view of the load engagement mechanism and rotational drive motor.

FIG. 21 shows the load engagement mechanism in greater detail, isolated from the remainder of the tractor unit. It can be seen that the support arm 28 is in the form of a hydraulic cylinder which is mounted to the swivelling support 32 at a common axis pin 32, and similarly a pair of struts 26*a*, 26*b* making up the support arm 26 are mounted to this common pin. Also seen in greater detail are the hydraulic cylinder and piston 40, 42 and transverse arm 44 on which they act as described in relation to FIGS. 5 and 6.

Below the swivelling support 32 there is a bearing (not shown) rotatably mounting the swivelling support 32 to the chassis 16 (not shown). A large spur gear 60 is fixedly connected to the swivelling support 32 and a small spur gear 62 and motor 64 is mounted on the chassis. By driving the motor 64 in an appropriate direction, the swivelling support 32 and thus the entire load engagement mechanism 24 can be rotated relative to the chassis by any desired angular amount. The skilled person will also appreciate that, due to the gear ratio, a relatively small motor 64 can generate sufficient torque to drive a very heavy load mounted on the plate 34 at low speed.

Figure 22:
FIGS. 22-25 show successive stages in the manoeuvring of a load in a confined space by the tractor unit of the invention.
Figure 22:
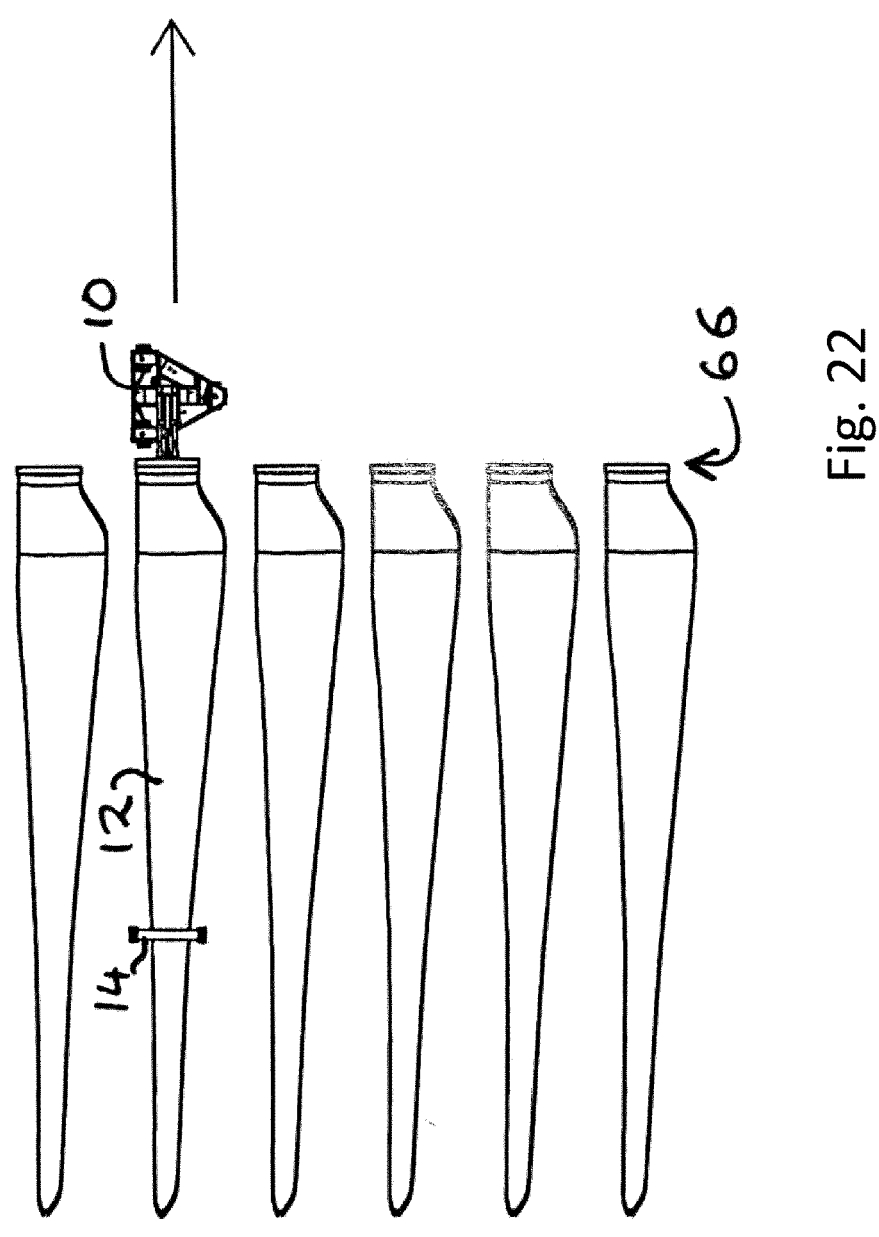

FIGS. 22 to 25 show successive stages of manoeuvring a wind turbine blade 12 mounted on a tractor unit 10 and trailer unit 14 in a confined space between a line of wind turbine blades 66 and a barrier 68. The confined space is approximately the same length as the load itself. FIG. 22 shows the starting position with the tractor unit in aligned mode and in position to pull the load 12 to the right directly towards the barrier 68.

Figure 23:
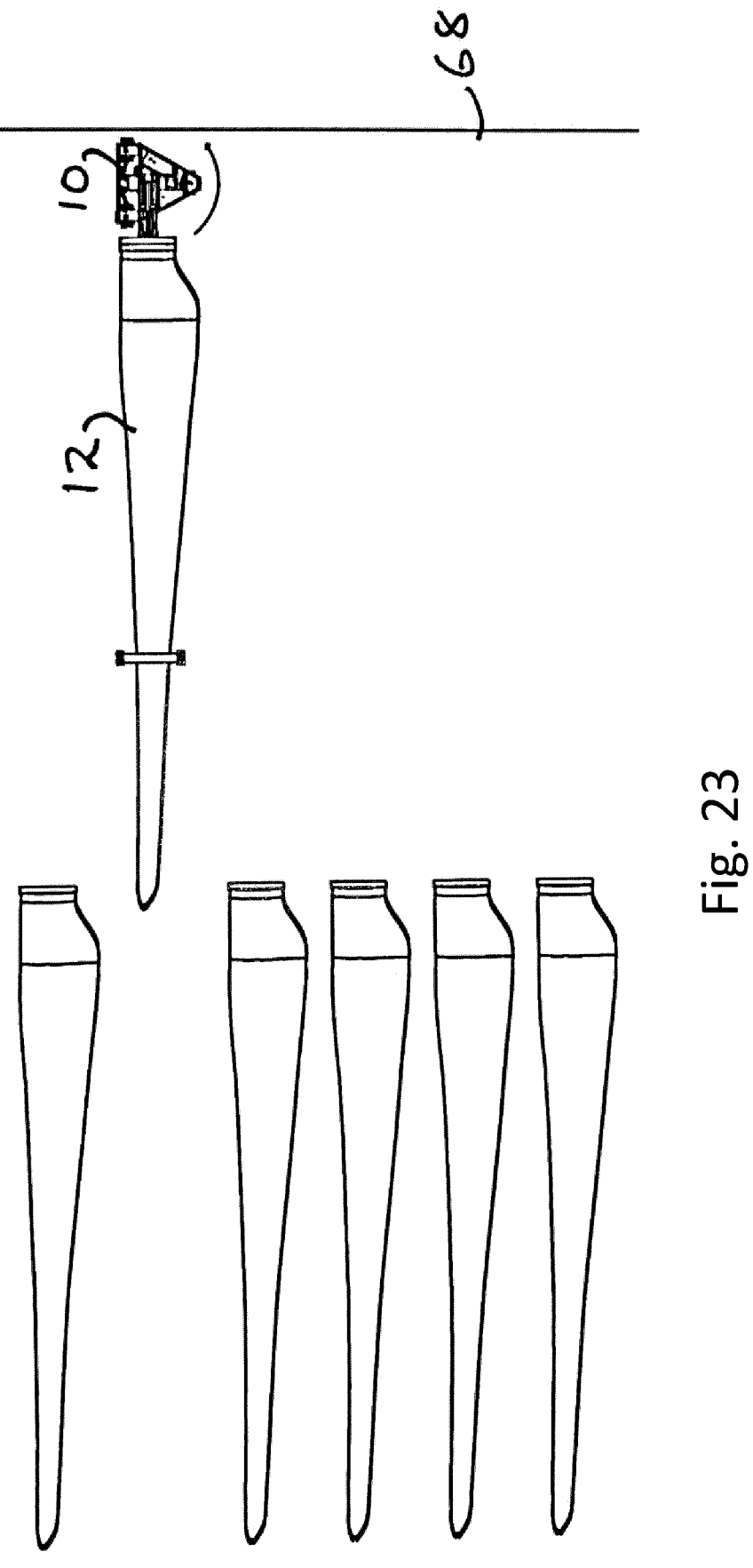
Figure 24:
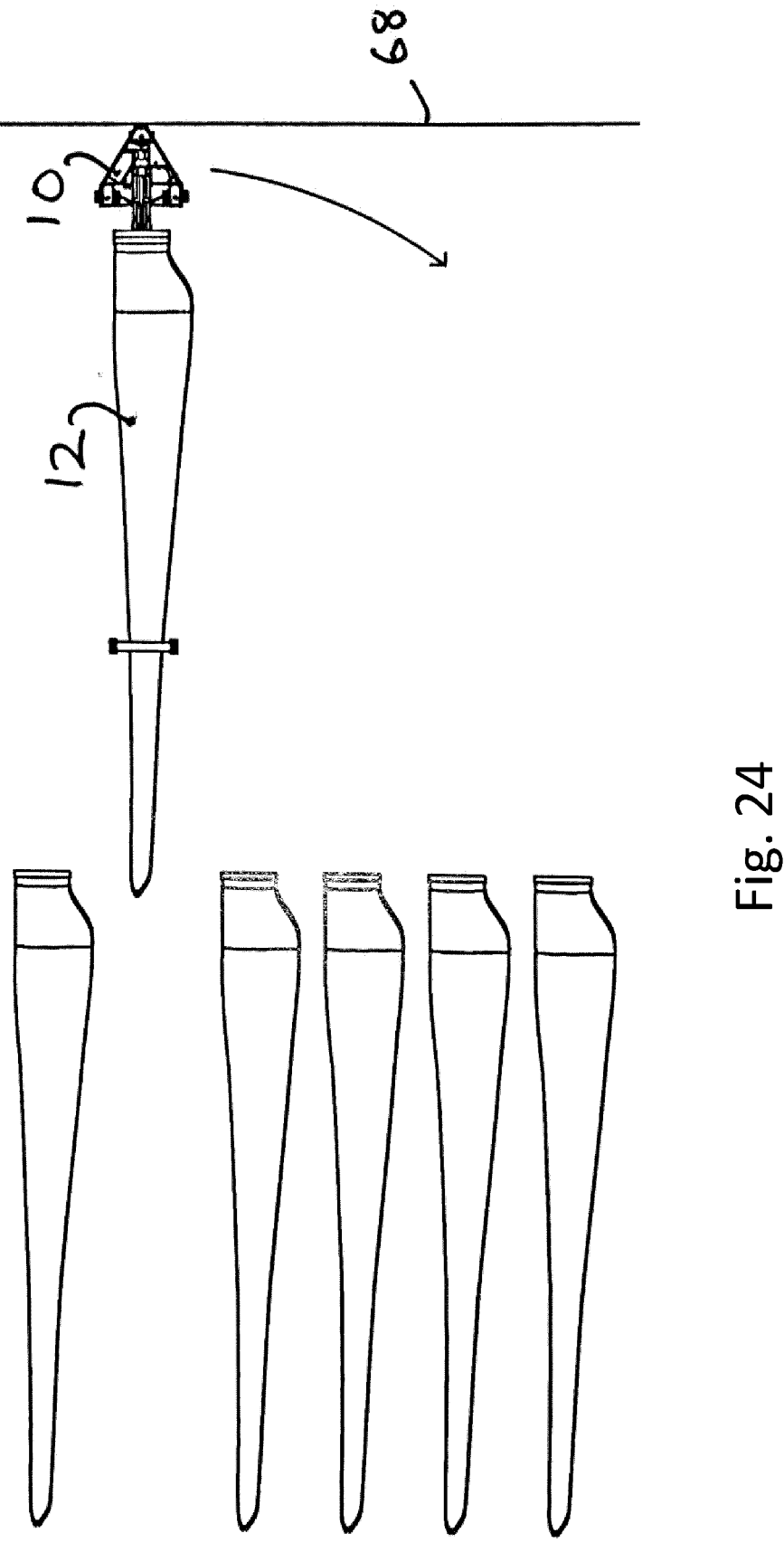

In FIG. 23, the tractor unit has reached the barrier and is ready to begin a transition to an aligned mode oriented at 90 degrees to the current position, following the sequence of steps previously illustrated in FIGS. 15 to 20. Thus, the tractor unit enters carousel mode, and it spins about the vertical axis upon which the swivelling support 32 is mounted, with the motor and gear arrangement of FIG. 21 causing the load to be counter-rotated relative to the chassis at the same rate as the chassis is rotating relative to the ground. In this way, as shown in FIG. 24, the tractor unit 10 may be rotated fully through 90° and returned to the aligned mode ready to be driven in a direction perpendicular to the former direction and steered away from the barrier 68.

Figure 25:
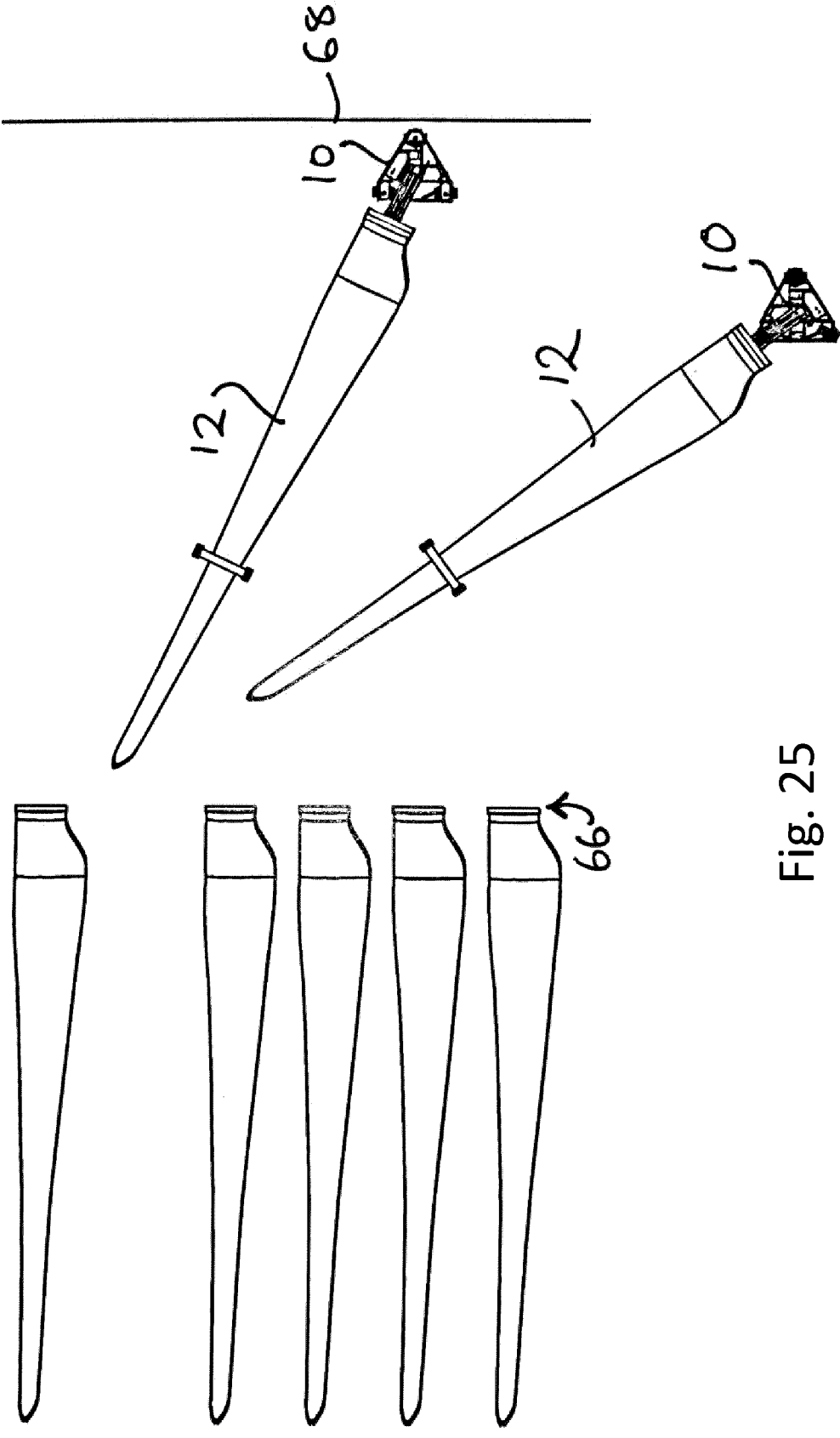

FIG. 25 shows two further positions in the manoeuvring of this load, as the load is pulled by the tractor unit 10 downwardly and away from the barrier, and between the barrier and line of blades 66, with the trailer unit following.

The steering inputs and the signals to transition between aligned and carousel modes may be provided from an operator or driver station on the unit itself or, more preferably in the embodiment shown, by a handheld operator remote control unit (not shown) which communicates with a receiver and processor on the tractor unit. As the skilled person will appreciate, inputs and control signals need not be provided by a human operator but maybe computer generated such that the vehicle is autonomous or AI controlled. The computerised system providing such control may be on board, may be remotely located, or may be distributed between onboard and remote components.

FIGS. 26-28 show a variant embodiment in which all three wheels are driven and steerable. In FIG. 26, the wheels 70 are shown in aligned mode identical to the previously described embodiment. FIG. 27 shows that the three wheels can each be rotated through 90 degrees so that they adopt an aligned mode which can drive at 90 degrees to the former direction without rotation of the chassis 72. FIG. 28 shows the wheel set in a carousel mode, which is identical to that previously described and has the same advantages. It will be appreciated that while this steering arrangement is more complex and costly, it allows for additional manoeuvrability from the first embodiment, but shares with it the advantage of being able to spin the chassis without moving the load.

While the embodiments thus described have three wheels, the skilled person will appreciate that the disclosure can be extended to a four-wheeled embodiment or even to more than four wheels if desired, with the proviso that the wheel set is steerable so that it can adopt an aligned mode with the wheels capable of driving in a straight line or deviating from that straight line, and a carousel mode, in which the axes of rotation of the wheels intersect at a common vertical axis and the load engagement mechanism is similarly capable of swivelling about the same vertical axis so that the load can remain stationary as the chassis spins.

The invention claimed is:

1. A tractor unit for transporting an elongated load, comprising:
    a tractor unit body in the form of a closed generally triangular chassis;
    a wheel set comprising three ground-engaging wheels, wherein one of said wheels is mounted at each corner of the triangular chassis, such that the wheels are positioned to define a triangle when viewed in plan view, all of which are driven, said wheel set supporting, driving and steering the tractor unit body; and
    a load engagement mechanism for mounting to and supporting said elongate load, said load engagement mechanism being mounted on said tractor unit body and configured to be lowered toward ground level at a point outside the periphery of the triangular chassis for mounting to said elongate load, wherein said load engagement mechanism is mounted pivotally on the tractor unit body about a substantially vertical axis located at the incentre of said triangle;
    wherein the three wheels of the wheel set are steerable wheels whose orientation may be varied to transform the wheel set between an aligned mode of operation and a carousel mode of operation;

wherein in the aligned mode of operation the wheels of the wheel set are aligned with one another when in a neutral steering position causing the tractor unit body to follow a straight line when driven with neutral steering, and are steerable to deviate the direction of travel to either side of said straight line;

wherein in the carousel mode of operation the wheels of the wheel set are oriented relative to one another with their axes of rotation intersecting at said vertical axis, whereby when the one or more driven wheels are driven in said carousel mode of operation, the tractor unit body rotates about said vertical axis;

wherein said load engagement mechanism remains in fixed position relative to the ground by counter-rotation of the load engagement mechanism about said vertical axis relative to the tractor unit body as the tractor unit body rotates.

2. A tractor unit according to claim 1, wherein the load engagement mechanism is mounted on the tractor unit body by a swivel mount and the tractor unit further comprises a motor for rotating the load engagement mechanism relative to the tractor unit body about said swivel mount.

3. A tractor unit according to claim 1, further comprising a steering controller for controlling the steering of the three wheels of the wheel set.

4. A tractor unit according to claim 3, wherein said steering controller is responsive to received input signals to switch the wheel set between said aligned and carousel modes of operation and being responsive, when in said aligned mode of operation, to vary the steering to follow a straight or curved path according to received steering inputs.

5. A tractor unit according to claim 3, wherein the steering controller receives steering inputs from a remote-control unit.

6. A tractor unit according to claim 1, further comprising a drive controller for controlling the speed and optionally the direction of drive applied to the or each driven wheel of the wheel set in response to received input signals.

7. A tractor unit according to claim 2, further comprising a motor controller for controlling the motor, said controller being operable to determine the angular rotation of the tractor unit body about the common vertical axis when in the carousel mode of operation, and to cause the simultaneous counter-rotation of said load engagement mechanism in an equal and opposite angular amount to maintain the position of the load engagement mechanism stationary with respect to the ground.

8. A tractor unit according to claim 7, wherein the motor controller receives as an input a signal indicative of the speed at which the or each driven wheel is being driven, and generates as an output a motor control signal effective to cause a counter-rotation of the load engagement mechanism in an equal and opposite angular amount.

9. A tractor unit according to claim 1, wherein a pair of said wheels is disposed on one side of the tractor unit body, and the other wheel is disposed at an opposed side of the tractor unit body.

10. A tractor unit according to claim 9, wherein the pair of wheels disposed on one side of the tractor unit body are aligned with one another when in the aligned mode with neutral steering.

11. A tractor unit according to claim 9, wherein the pair of wheels disposed along one side of the tractor unit body are steerable to achieve the carousel mode by aligning their axles towards said common vertical axis, said common vertical axis lying along the direction of alignment of the axle of the other wheel, said common vertical axis lying within the triangle defined by the three wheel positions.

12. A tractor unit according to claim 1, wherein the load engagement mechanism comprises at least one hydraulically extendable arm which can be extended or retracted to raise and lower a load mounted on the load engagement mechanism.

13. A tractor unit according to claim 12, wherein said hydraulically extendable arm forms one side of a triangle, the other two sides being formed of fixed length members.

14. A tractor unit according to claim 13, wherein the load engagement mechanism is mounted on the tractor unit body at an apex of said triangle, said apex being between two sides of which one is the hydraulically extendable arm.

15. A tractor unit according to claim 14, wherein the fixed length member on the side opposite said apex is a mounting member adapted for mounting to a load, such that when a load is mounted to said mounting member, the angle adopted by the hydraulically extendable arm relative to the tractor unit body is determined by the vertical orientation of the mounting member and the length of the hydraulically extendable arm.

16. A tractor unit according to claim 1, wherein the load engagement mechanism comprises a supporting hydraulic cylinder for supporting the weight of the mechanism and adjusting the position thereof during engagement with a load.

17. A system for transporting an elongated load, comprising:

the tractor unit according to claim 1; and a wheeled trailer unit for supporting the load at a position remote from the tractor unit, such that the tractor unit and wheeled trailer unit are connected by the load itself.

* * * * *